(12) United States Patent
Murata et al.

(10) Patent No.: US 7,821,950 B2
(45) Date of Patent: Oct. 26, 2010

(54) EVALUATION APPARATUS OF HUB UNIT AND EVALUATING METHOD OF HUB UNIT

(75) Inventors: Junji Murata, Kashiba (JP); Toshiyuki Maeda, Nara (JP); Toshihiro Hakata, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 127 days.

(21) Appl. No.: 12/219,586

(22) Filed: Jul. 24, 2008

(65) Prior Publication Data

US 2009/0040935 A1 Feb. 12, 2009

(30) Foreign Application Priority Data

Jul. 26, 2007 (JP) .......................... P2007-194629

(51) Int. Cl.
*G06F 11/00* (2006.01)
(52) U.S. Cl. .................................................... 370/242
(58) Field of Classification Search ................ 370/210, 370/242–246, 250–252
See application file for complete search history.

(56) References Cited

U.S. PATENT DOCUMENTS

| 7,184,930 | B2 * | 2/2007 | Miyasaka et al. ............ 702/183 |
| 2008/0033695 | A1 * | 2/2008 | Sahara et al. ............... 702/185 |
| 2008/0234964 | A1 * | 9/2008 | Miyasaka et al. ........... 702/113 |

FOREIGN PATENT DOCUMENTS

| JP | 62-151621 | 7/1987 |
| JP | 11-248524 | 9/1999 |
| JP | 2006-234786 | 9/2006 |

* cited by examiner

*Primary Examiner*—Frank Duong
(74) *Attorney, Agent, or Firm*—McGinn IP Law Group, PLLC

(57) ABSTRACT

In an evaluation apparatus of a hub unit, a signal processing unit outputs frequency analysis signals which indicate such a result obtained by that an output signal of an acceleration sensor fixed on a hub unit by a magnet is processed via an A/D converting unit and an envelope detecting unit, and thereafter, the processed sensor signal is analyzed for a frequency analysis by an FFT unit. Then, an evaluation output unit evaluates damage conditions of the hub unit based upon signal strengths of specific frequencies, and overall values, which are acquired from the frequency analysis signals, and then, outputs the evaluated damage condition to a display unit.

11 Claims, 4 Drawing Sheets

EVALUATION APPARATUS OF HUB UNIT AND EVALUATING METHOD OF HUB UNIT

BACKGROUND OF THE INVENTION

1. Field of the Invention

The present invention is related to an evaluation apparatus of a hub unit, and an evaluating method of the hub unit, which evaluates whether or not damage of the hub unit is present, and also, evaluates a sort of damage.

2. Related Art

Conventionally, an abnormal event detecting apparatus for a hub unit has been proposed (JP-A-11-248524). The above-described abnormal event detecting apparatus for the hub unit compares an amount with a predetermined value so as to detect an abnormal event, while the amount is defined by that an averaged value of output vibrations produced based upon outputs of a strain gauge mounted on a fixed wheel of the hub unit is changed from a reference value.

However, although the above-described abnormal event detecting apparatus for the hub unit is capable of detecting increases in temperatures which are caused by overloads given to bearings and deteriorations in bearings, this conventional abnormal event detecting apparatus cannot simply determine sorts of damage from each other made in the hub unit.

On the other hand, it is required for such a hub unit abnormal event detecting apparatus capable of judging sorts of damage made in hub units in a simpler manner.

SUMMARY OF THE INVENTION

As a consequence, an object of the present invention is to provide an evaluation apparatus of a hub unit and an evaluating method of the hub unit, which can determine sorts of damage made in the hub unit from each other in a simple manner.

To solve the above-described problem, an evaluation apparatus of a hub unit, according to the present invention, is featured by comprising:

an acceleration sensor which contains a magnetic force mounting unit and a main body of the acceleration sensor fixed on the magnetic force mounting unit, the magnetic force mounting unit being fixed on a fixing-sided member of the hub unit of a vehicle by utilizing magnetic force thereof;

a signal processing unit which includes an envelope detecting unit and a frequency analyzing unit, the envelope detecting unit performing an envelope detection with a signal entered from the acceleration sensor, and the frequency analyzing unit performing a frequency analysis with a signal entered from the envelope detecting unit so as to produce a frequency analysis signal which contains both a signal strength of a specific frequency and an overall value; and an output unit for outputting the frequency analysis signal entered from the signal processing unit.

In accordance with the above-described evaluation apparatus of the hub unit related to the present invention, the signal processing unit inputs the frequency analysis signal to the above-described output unit, while the frequency analysis signal contains both the signal strength of the specific frequency and the overall value, which represent such a result that the output signal of the acceleration sensor fixed on the hub unit by the magnetic force mounting unit is detected for an envelope detection, and then, a signal entered from the envelope detection is analyzed for a frequency analysis. Then, the output unit outputs the signal strength of the specific frequency and the overall value, which are contained in the above-explained frequency analysis signal, to a display unit, or the like.

As a consequence, in accordance with the present invention, the output signal of the acceleration sensor is analyzed for the frequency analysis and with employment of the signal strength of the specific frequency and the overall value as to the frequency analysis signal produced by this frequency analysis, the sorts of damage of the hub unit can be determined from each other. Also, the acceleration sensor main body can be detachably mounted with respect to the fixing-sided member of the hub unit in a simple manner. Also, the driven wheel is rotated by the driven wheel driving unit in order to rotate the rotation-sided member of the hub unit of the driven wheel, so that an evaluation test for the above-described hub unit can be carried out. On the other hand, in such a case that an evaluation test for such a hub unit of a drive wheel is carried out, the drive wheel is rotated by a driving power source such as an engine, so that the evaluation test for the hub unit can be carried out.

Also, an evaluating method of a hub unit, according to an embodiment of the present invention, is featured by steps:

An evaluating method for a hub unit, comprising steps of:

rotating wheels of a vehicle;

fixing an acceleration sensor on a fixing-sided member of the hub unit of said vehicle by utilizing a magnetic force produced by a magnetic force mounting unit of said acceleration sensor;

performing a an envelope detection and subsequently a frequency analysis with a signal outputted from said acceleration sensor so as to acquire a frequency analysis signal which contains a signal strength of a specific frequency and an overall value; and evaluating a damage condition of said hub unit based upon the signal strength of the specific frequency of said frequency analysis signal and the overall value thereof.

In accordance with the evaluating method of the hub unit related to the present embodiment, the output signal of the acceleration sensor fixed on the above-described hub unit by utilizing the magnetic force mounting unit is detected for an envelope detection, and thereafter, a signal entered from the envelope detection is analyzed for a frequency analysis. Then, the damage condition of the above-described hub unit is evaluated based upon both the signal strength of the specific frequency and the overall value, which have been acquired from the frequency analysis signal, and which indicate the frequency analysis result. As a consequence, it is possible to judge whether or not the damage is present in the hub unit, and to determine the sorts of damage from each other in a simple manner.

In accordance with the present invention, the output signal of the acceleration sensor is analyzed for the frequency analysis and with employment of the signal strength of the specific frequency and the overall value as to the frequency analysis signal produced by this frequency analysis, so that it is possible to judge whether or not the damage of the hub unit is present, and also the sorts of damage of the hub unit can be determined from each other in the simple manner. Also, the acceleration sensor main body can be detachably mounted with respect to the fixing-sided member of the hub unit in a simple manner.

DETAILED DESCRIPTION OF THE PREFERRED EMBODIMENTS

The present invention will now be described in detail with reference to illustrated embodiments.

Figure 1:
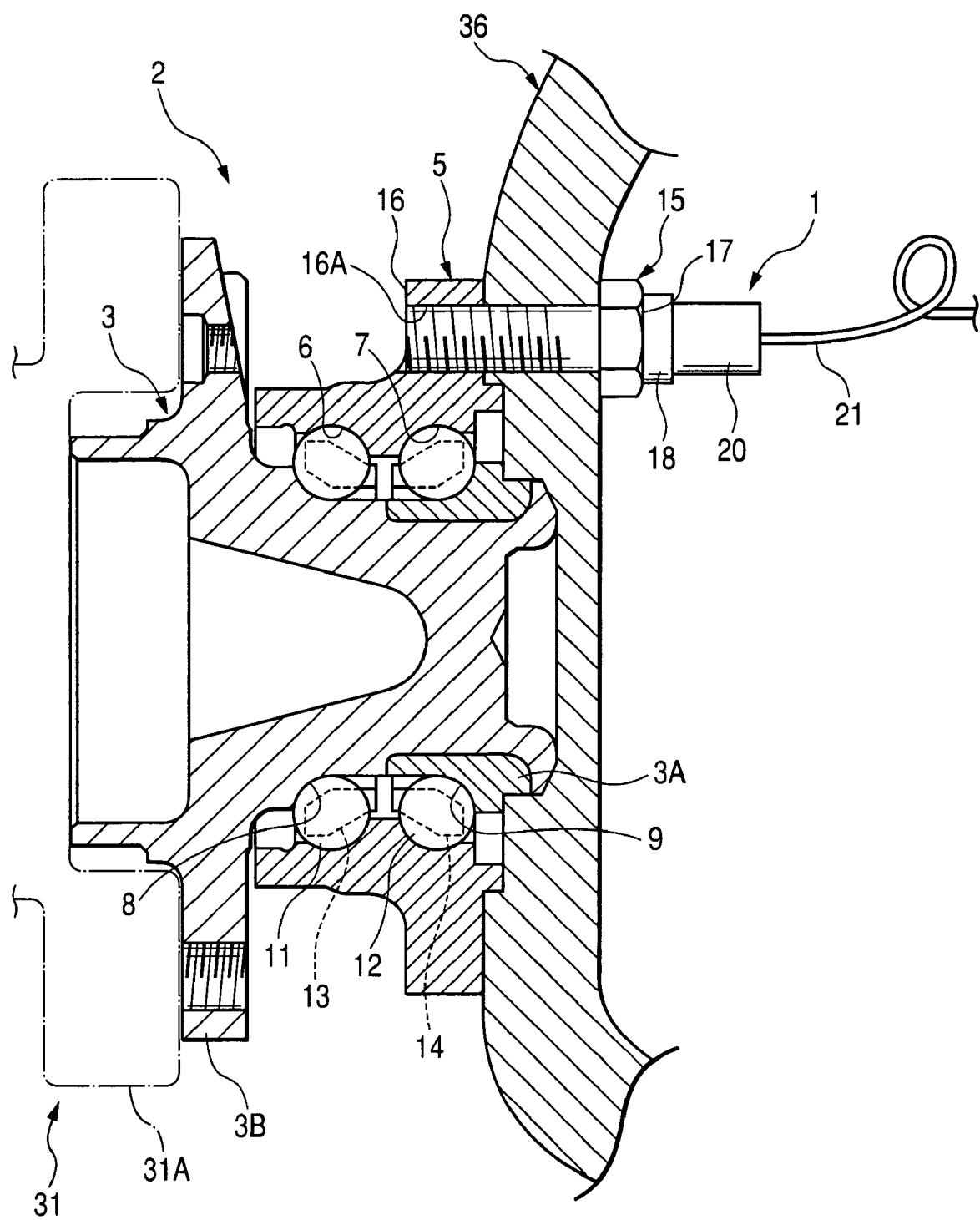
FIG. 1 is a sectional view for showing such a condition that an acceleration sensor has been mounted on a hub unit, while an evaluation apparatus for a hub unit according to an embodiment of the present invention is equipped with the acceleration sensor.

FIG. 1 shows both an acceleration sensor 1 and a hub unit 2, which are provided by an embodiment as to an evaluation apparatus of a hub unit according to the present invention. The above-described accelerator sensor 1 is mounted on the hub unit 2. As shown in FIG. 1, the hub unit 2 is provided with a shaft member 3 corresponding to a rotation-sided member; an outer ring 5 corresponding to a fixing-sided member; plural rows of balls 11 and 12; and cages 13 and 14 which hold the balls 11 and 12. The plural rows of balls 11 and 12 are arranged between raceway surfaces 6, 7 of the outer ring 5, and raceway surfaces 8, 9 of the shaft member 3. It should be noted that the raceway surface 9 of the above-described shaft member 3 has been formed on an inner ring 3A provided by the shaft member 3.

The outer ring 5 corresponding to the fixing-sided member of the above-described hub unit 2 has a flange 16, while the flange 16 of the outer ring 5 has been fastened to a knuckle 36 by a hub bolt 15 meshed with a screw hole 16A formed in this flange 16. Then, a magnet 18 functioning as a magnetic force mounting unit has been fixed on a flat upper plane 17 of a head portion of the above-described hub bolt 15 by utilizing magnetic force of the magnet 18. An acceleration pickup 20 functioning as an acceleration sensor main body has been fixed on this magnet 18. Both the acceleration pickup 20 and the magnet 18 have constructed the above-described acceleration sensor 1. It should also be noted that the above-described magnet 18 may be alternatively fixed on either the knuckle 36 or the outer ring 5 instead of such a structure that the above-described magnet 18 is fixed on an upper plane 17 of the hub bolt 15 which fastens the outer ring 5.

Figure 2:
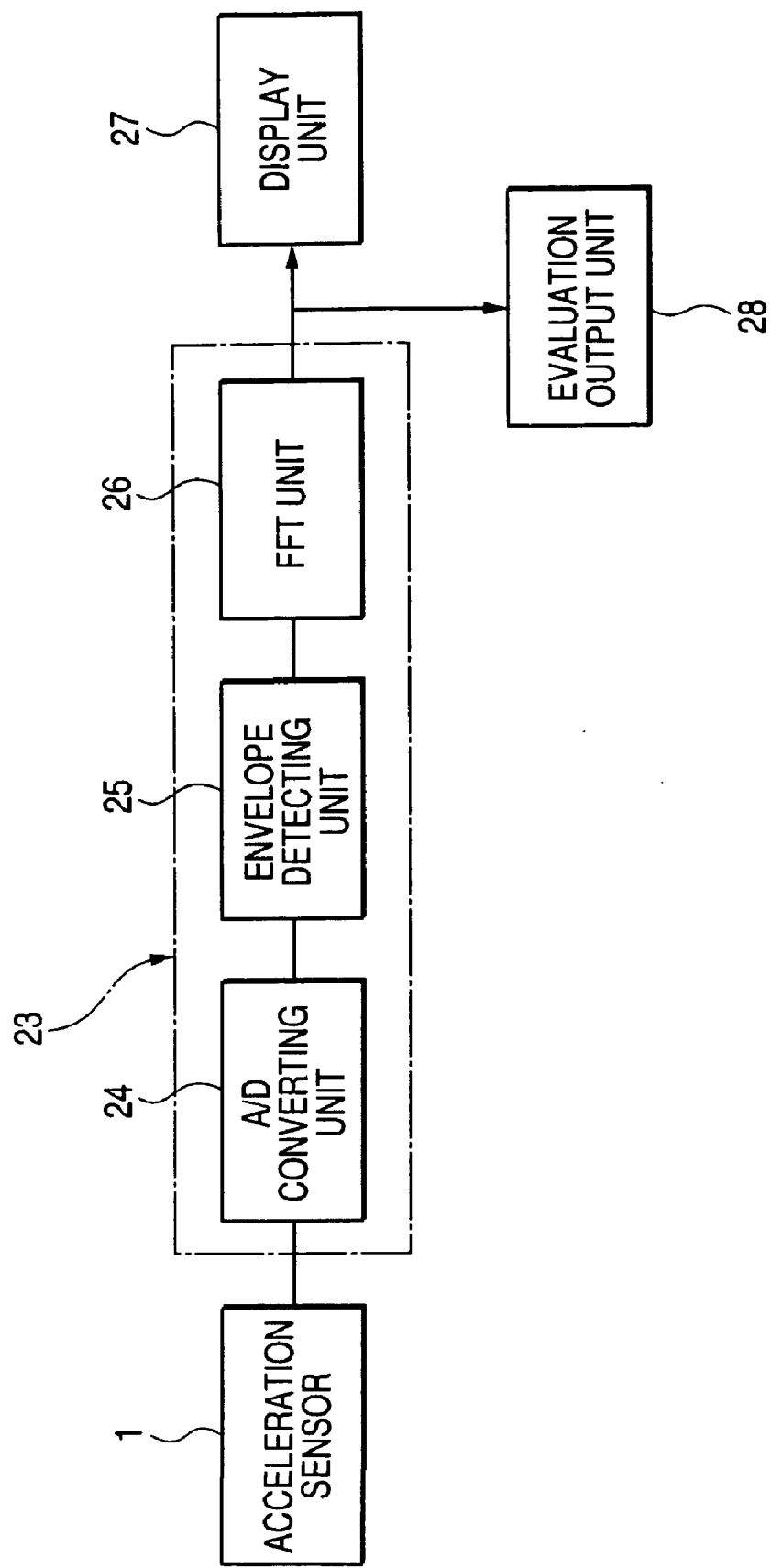
FIG. 2 is a block diagram for indicating an arrangement of the hub unit evaluation apparatus according to the present embodiment.

A signal line 21 of the above-described acceleration sensor 1 has been connected to an A/D converting unit 24 of a signal processing unit 23 shown in FIG. 2. The signal processing unit 23 contains the A/D converting unit 24, an envelope detecting unit 25, and an FFT unit (Fast Fourier Transformation unit) 26. The A/D converting unit 25 converts an analog signal entered from the acceleration sensor 1 into a digital signal. The envelope detecting unit 25 performs envelope detection with the digital signal entered from the A/D converting unit 24. The FFT unit 26 functioning as a frequency analyzing unit for frequency analysis using fast Fourier transformation with an envelope detection signal entered from the envelope detecting unit 25.

Also, both a display unit 27 and an evaluation output unit 28 have been connected to the fast Fourier transforming unit 26, which function as output units. A frequency analysis signal indicative of the above-described frequency analysis result is inputted from the FFT unit 26 into the display unit 27, so that the display unit 27 displays thereon this frequency analysis signal. The display unit 27 is constituted by a liquid crystal display panel as one example. It should also be noted that the above-described display unit 27 may be alternatively replaced by a printer which prints the frequency analysis signal.

On the other hand, the frequency analysis signal indicative of the above-described frequency analysis result is similarly inputted from the above-described FFT unit 26 to the above-described evaluation output unit 28. This evaluation output unit 28 evaluates a damage condition of the hub unit 2 based upon a signal strength of a specific frequency and an overall value, which are obtained from the above-described frequency analysis signal, and outputs the damage condition.

Figure 3:
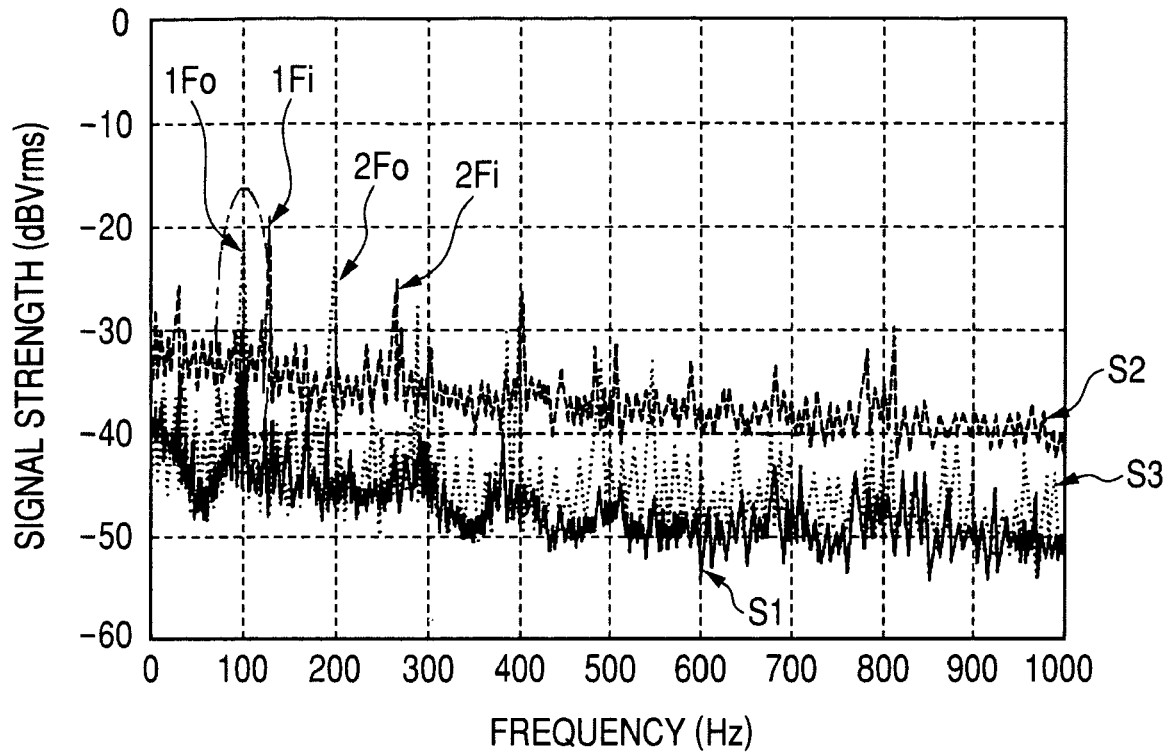
FIG. 3 is a diagram for representing one example of frequency analysis signals outputted from an FFT unit employed in the present embodiment.

In this case, FIG. 3 shows an example of a frequency analysis signal outputted from the above-described FFT unit 26. In FIG. 3, an abscissa indicates a frequency (Hz), and an ordinate represents a signal strength (dBVrms). In FIG. 3, a signal "S1" indicated by a solid line corresponds to a frequency analysis signal acquired in such a case that the hub unit 2 is a new product. Also, a signal "S2" indicated by a broken line corresponds to a frequency analysis signal acquired in such a case that rust has occurred in the hub unit 2. Furthermore, a signal "S3" represented by a dot line corresponds to a frequency analysis signal acquired in such a case that false brinelling has occurred in the hub unit 2.

In FIG. 3, symbol "1Fo" shows a signal strength of the signal "S3" at a basic frequency "fo", which is caused by that the outer ring 5 is vibrated since the balls 11 and 12 are rotated on the raceway surfaces 6 and 7 of the outer ring 5 when the shaft member 3 is rotated at a predetermined rotation number. As shown as a sample "3" in FIG. 4, the signal strength "1Fo" of the frequency analysis signal "S3" at the basic frequency "fo" when the above-described false brinelling has occurred is given as −21.7 (dBVrms). This sample "3" corresponds to such a sample in the case that the false brinelling has occurred in the hub unit 2.

Figure 4:
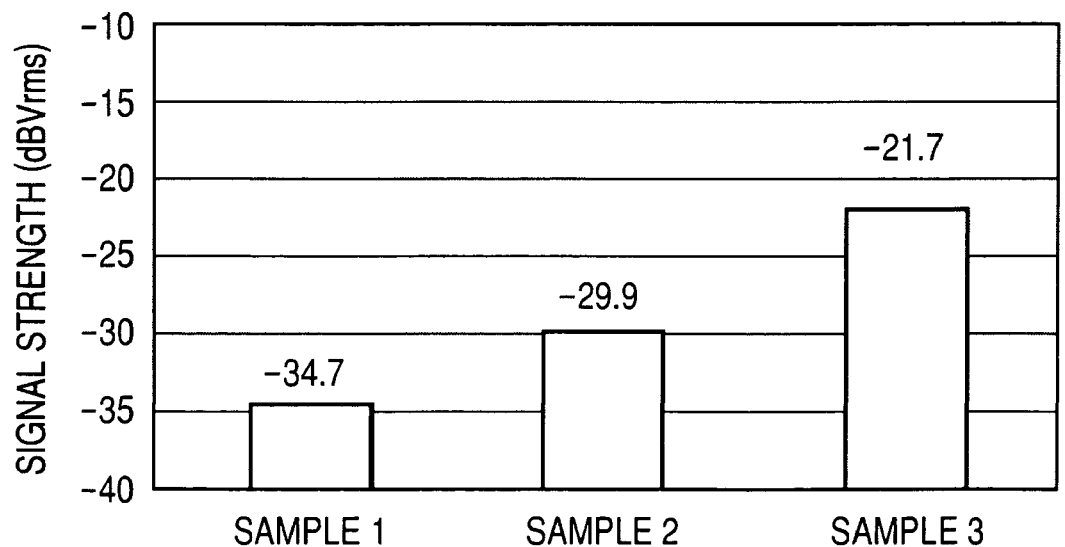
FIG. 4 is a diagram for indicating signal strengths at a basic frequency "fo" in the frequency analysis signals "S1", "S2", "S3" of FIG. 3.

Also, in FIG. 4, a sample "2" is a sample in such a case that rust has occurred in the hub unit 2. A signal strength −29.9 (dBVrms) in this sample "2" indicates a signal strength of the signal "S2" shown in FIG. 3 at the basic frequency "fo." Also, in FIG. 4, a sample "1" corresponds to a sample in such a case that the hub unit 2 is a new product. A signal strength −34.7 (dBVrms) in this sample 1 indicates a signal strength of the signal S1 shown in FIG. 3 at the basic frequency "fo."

Also, symbol "1Fi" shown in FIG. 3 represents a signal strength of the signal "S2" at a basic frequency "fi" which is caused by that the shaft member 3 is vibrated since the balls 11 and 12 are rotated on the raceway surfaces 8 and 9 of the shaft member 3 when the shaft member 3 is rotated at the above-described predetermined rotation number. Also, symbol "2Fo" shown in FIG. 3 indicates such a signal strength of the signal "S3" at a frequency "2fo" which is two times higher than the above-described basic frequency "fo." Also, symbol "2Fi" shown in FIG. 3 indicates such a signal strength of the signal "S2" at a frequency "2fi" which is two times higher than the above-described basic frequency "fi."

As a consequence, when a signal strength having the above-described basic frequency "fo" in a frequency analysis signal entered from the FFT unit 26 exceeds a predetermined threshold value (as one example, −25 dVbrms), the evaluation output unit 28 evaluates such a fact that the false brinelling has occurred on the raceway surfaces 6 and 7 of the outer ring 5, and then, outputs this evaluation to the above-described display unit 27. Also, when a signal strength having the above-described basic frequency "fi" in the above-described frequency analysis signal exceeds the predetermined threshold value, the evaluation output unit 28 evaluates such a fact that the false brinelling has occurred on the raceway surfaces 8 and 9 of the shaft member 3 and then, outputs this evaluation to the above-described display unit 27. It should also be noted that the evaluation output unit 28 may alternatively evaluate damage conditions as to the outer ring 5 and the shaft member 3 based upon the signal strengths of the frequencies "2fo" and "2fi" which are two times higher than the basic frequencies "fo" and "fi", instead of the signal strengths of the basic frequencies "fo" and "fi" in the above-described frequency analysis signals. Also, the evaluation output unit 28 may alternatively evaluate damage conditions as to the outer ring 5 and the shaft member 3 based upon the signal strengths of the frequencies "2fo" and "2fi" which are two times higher than the basic frequencies "fo" and "fi", and further, the signal strengths of the basic frequencies "fo" and "fi" in the frequency analysis signals.

Figure 5:
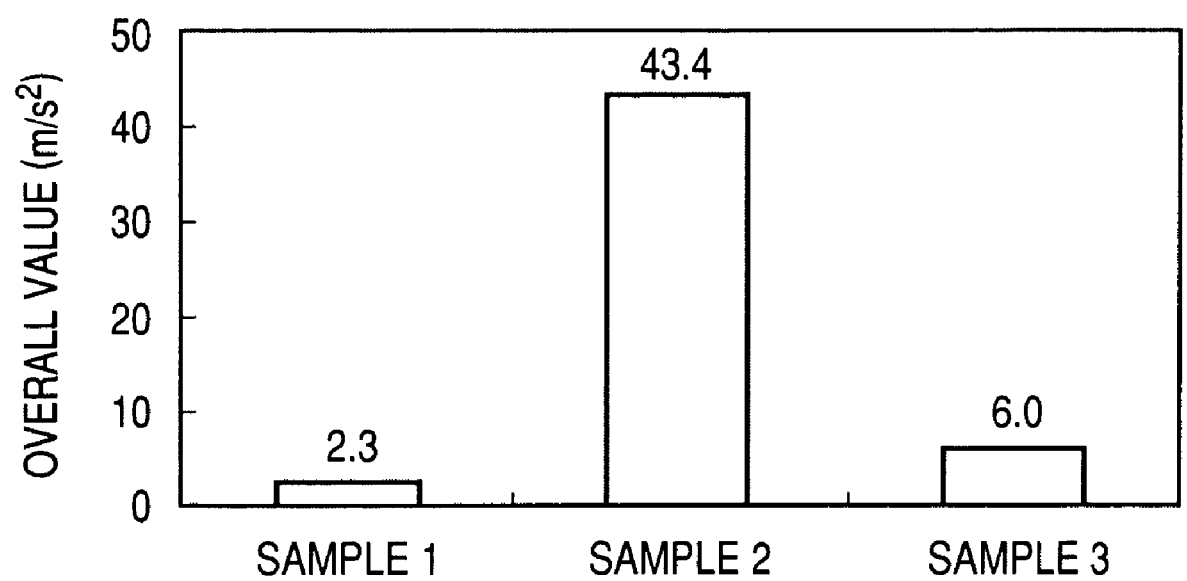
FIG. 5 is a diagram for showing overall values in the frequency analysis signals "S1", "S2", "S3" of FIG. 3.

Next, FIG. 5 indicates that an overall value of the frequency analysis signal "S3" in such a sample "1" that the hub unit 2 is a new product is equal to 2.3 (m/s$^2$), and an overall value of the frequency analysis signal "S2" in such a sample "2" that rust has occurred in the hub unit 2 is equal to 43.4 (m/s$^2$). Also, FIG. 5 indicates that an overall value of the frequency analysis signal "S3" in such a sample "3" that false brinelling has occurred in the hub unit 2 is equal to 6.0 (m/s$^2$). As can be understood from FIG. 5, in such a case that the rust has occurred in the hub unit 2, the overall value of the frequency analysis signal "S2" becomes the largest value.

As a consequence, the above-described evaluation output unit 28 evaluates that the rust has occurred in the hub unit 2 when an overall value of a frequency analysis signal entered from the FFT unit 26 exceeds a predetermined threshold value (20 (m/s$^2$) as one example), and then, outputs this evaluation result to the display unit 27.

Then, in such a case that an overall value of a frequency analysis signal entered from the above-described FFT unit 26 becomes smaller than the predetermined threshold value, and further, signal strengths of the above-described frequency analysis signals having the basic frequencies "fi" and "fo", the evaluation output unit 28 evaluates that the hub unit 2 is a new product, or is a substantially new product, and then, outputs this evaluation result to the display unit 27.

Also, the evaluation apparatus of the hub unit, according to the present embodiment, is provided with a driven wheel driving unit 31 which is indicated by a dot and dash line in FIG. 1. The driven wheel driving unit 31 contains an adaptor flange 31A and a motor (not shown) which rotatably drives the adapter flange 31A. Then, in such a case that the above-described hub unit 2 corresponds to a hub unit of a driven wheel, the vehicle is jacked up so as to dismount both a wheel and a brake disk. Next, under such a condition that the adaptor flange 31A of the driven wheel driving unit 31 indicated by a dot and dash line shown in FIG. 1 has been contacted to the flange 3B of the shaft member 3 in a friction manner, the above-described motor is driven so as to rotate the adaptor flange 31A by which the shaft member 3 is rotated. On the other hand, in such a case that the above-described hub unit 2 corresponds to a hub unit of a drive wheel, this drive wheel is put on a freely rotatable roller, and then, the wheel is rotated by an engine of a vehicle.

Then, the acceleration sensor 1 is fixed on the flat upper plane 17 of the hub bolt 15 by the magnet 18 by utilizing the magnetic force; the frequency of the output signal outputted from the acceleration sensor 1 is analyzed; and as previously explained, the damage condition of the hub unit 2 is evaluated based upon both the signal strength of the specific frequency and the overall value, which are acquired from the frequency analysis signal indicative of the frequency analysis result.

In accordance with the present embodiment, the hub unit evaluation apparatus can judge whether or not damage has occurred in a hub unit in a quantitative manner, and also, can diagnose a failure of a hub unit under such a condition that the hub unit has been assembled in a vehicle. As a result, even a car dealer can diagnose the failure of the hub unit.

It should also be understood that in the above-described embodiment, the signal processing unit 23 has contained the A/D converting unit 24. Alternatively, the signal processing unit 23 may alternatively and directly input the output signal of the acceleration sensor 1 to the envelope detecting unit 25. Also, in the above-described embodiment, the evaluation apparatus of the hub unit has been equipped with the evaluation output unit 28. Alternatively, while such an evaluation output unit 28 is not employed, a user may directly judge the damage condition of the hub unit 2 based upon both the frequency analysis signal and the overall value, which are exemplified in FIG. 3, and are displayed on the display unit 27.

What is claimed is:

1. An evaluation apparatus of a hub unit, comprising:
an acceleration sensor which includes a magnetic force mounting unit and a main body of the acceleration sensor fixed on said magnetic force mounting unit, said magnetic force mounting unit being fixed on a fixing-sided-member of the hub unit of a vehicle by utilizing a magnetic force thereof;
a signal processing unit which includes an envelope detecting unit and a frequency analyzing unit, said envelope detecting unit performing an envelope detection with a signal entered from said acceleration sensor, and said frequency analyzing unit performing a frequency analysis with a signal entered from said envelope detecting unit so as to produce a frequency analysis signal which includes a signal strength of a specific frequency and an overall value; and
an output unit for outputting said frequency analysis signal, including the signal strength of the specific frequency and the overall value, entered from said signal processing unit.

2. An evaluation apparatus of a hub unit, according to claim 1, wherein the signal processing unit includes an analog-to-digital (A/D) converting unit which converts an analog signal entered from the acceleration sensor into a digital signal, said envelope detecting unit performs an envelope detection with the digital signal entered from the A/D converting unit, and a fast Fourier transformation (FFT) unit functioning as the frequency analyzing unit to perform the frequency analysis with a signal entered from the envelope detection unit so as to produce the frequency analysis signal which includes the signal strength of the specific frequency and the overall value, and
wherein the output unit includes an evaluation output unit which evaluates and outputs a damage condition of the hub unit based upon the signal strength of the specific frequency and the overall value.

3. An evaluation apparatus of a hub unit, according to claim 1, wherein the hub unit corresponds to a hub unit of a driven wheel of the vehicle, and
wherein the evaluation apparatus further comprises a driven wheel driving unit for rotating the driven wheel.

4. An evaluation apparatus of a hub unit, according to claim 1, wherein the overall value comprises an acceleration value.

5. An evaluation apparatus of a hub unit, according to claim 1, wherein said magnetic force mounting unit is fixed on a surface perpendicular to an axis around which a rotating portion of the hub unit rotates.

6. An evaluation apparatus of a hub unit, according to claim 1, wherein the acceleration sensor is directed in a direction parallel to an axis around which a rotating portion of the hub unit rotates.

7. An evaluation apparatus of a hub unit, according to claim 2, wherein, if the overall value is greater than a predetermined value, then the damage condition comprises a value indicating rust.

8. An evaluation apparatus of a hub unit, according to claim 2, wherein, if the overall value is less than a predetermined value and the signal strength of the specific frequency is greater than a predetermined value, then the damage condition comprises a value indicating false brinelling.

9. An evaluation apparatus of a hub unit, according to claim 2, wherein, if the overall value is less than a predetermined value and the signal strength of the specific frequency is less than a predetermined value, then the damage condition comprises a value indicating no substantial damage.

10. An evaluating method for a hub unit, comprising:
rotating wheels of a vehicle;
fixing an acceleration sensor on a fixing-sided member of the hub unit of said vehicle by utilizing a magnetic force produced by a magnetic force mounting unit of said acceleration sensor;
performing an envelope detection and subsequently a frequency analysis with a signal outputted from said acceleration sensor so as to acquire a frequency analysis signal which includes a signal strength of a specific frequency and an overall value; and
evaluating a damage condition of said hub unit based upon the signal strength of the specific frequency of said frequency analysis signal and the overall value thereof.

11. An evaluating method for a hub unit according to claim 10, wherein an analog signal entered from the acceleration sensor is converted into a digital signal by an analog-to-digital (A/D) converting unit and the digital signal is detected for the envelope detection, and thereafter the digital signal is analyzed for the frequency analysis using fast Fourier transformation so as to acquire the frequency analysis signal which includes the signal strength of the specific frequency and the overall value.

* * * * *